(No Model.)

J. H. WALKER.
Cotton Seed Planter.

No. 234,508.  Patented Nov. 16, 1880.

Witnesses:
J. Walter Fowler,
Wm. F. Morsell

Inventor:
John H. Walker
by
A. H. Evans & Co.
Attys.

UNITED STATES PATENT OFFICE.

JOHN H. WALKER, OF GREENVILLE, SOUTH CAROLINA.

COTTON-SEED PLANTER.

SPECIFICATION forming part of Letters Patent No. 234,508, dated November 16, 1880.

Application filed October 6, 1880. (No model.)

*To all whom it may concern:*

Be it known that I, JNO. H. WALKER, of Greenville, in the county of Greenville and State of South Carolina, have invented a new and Improved Cotton-Seed Planter; and I hereby declare the following to be a full, clear, and exact description thereof, reference being had to the accompanying drawings, making part of this specification, in which—

Figure 1:
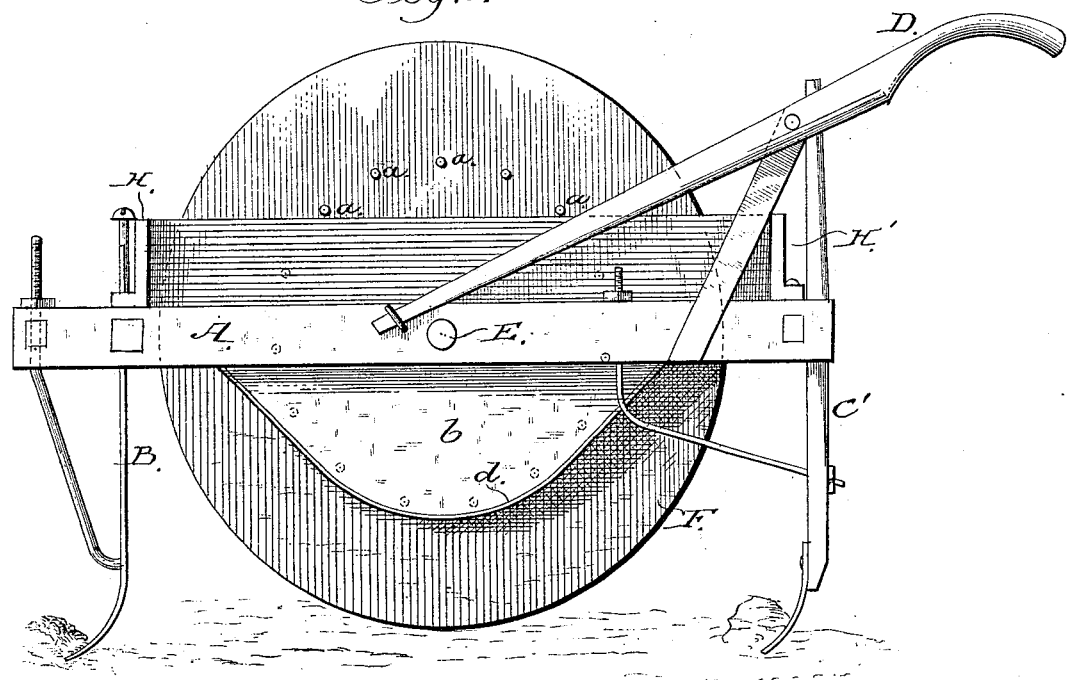
Figure 2:
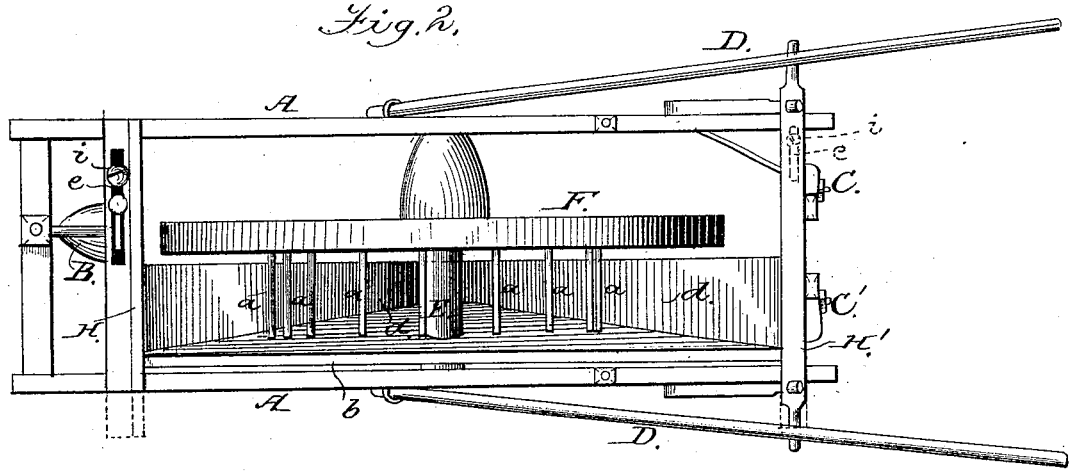

Figure 1 is a side elevation of the planter. Fig. 2 is a plan view of the same.

The object of my invention is to provide a machine which will readily and certainly plant cotton-seed; and my invention consists in the combination of devices herein described and claimed.

In order that those skilled in the art may make and use my invention, I will proceed to describe the manner in which I have carried it out.

In the said drawings, A A is a frame having at its forward end an adjustable shovel-plow, B, to make the furrow into which the seed fall, and at its rear end two adjustable covering-shovels, C C'. Projecting upwardly and rearwardly from the frame are two handles, D D, after the manner of a plow.

Journaled near the center of the frame-work is an axle, E, carrying the wheel F, upon which the machine rests and upon which it travels when in use. On one side of this wheel F, between the center and the periphery, is inserted a circular series of projecting pins or teeth, *a a a*, for a purpose hereinafter named.

The grain-receptacle is formed by an adjustable pocket, consisting of a vertical side, *b*, and curved bottom *d*, mounted in sliding heads H H', provided with slots *e e* and set-screws *i i*, to secure said heads to the main frame and allow side *b* to be moved to or from the side of wheel F, containing the pins *a a a*. The curve of the bottom *d* is so formed that the circular row of teeth approach it at its lowest or central point more closely than at any other.

The operation is as follows: The side and curved bottom being adjusted at the proper distance from the wheel to make the feed greater or less, as desired, the cotton-seed are placed within the receptacle and the machine moved forward, the plow B cutting a furrow, into which the seed drop by being forced through the opening between the wheel and the edge of curved bottom *d* through the rubbing or grinding agency of the pins or teeth *a a*, and then plows or shovels C C' straddle the furrow and force the earth back on the seed.

I find that this planter possesses many advantages over any other cotton-seed planter now in the market.

I am aware that it is not new to construct cotton-seed planters with wheels provided with pins in combination with stationary hoppers; but such construction is objectionable for the reason that in adjusting the wheel from or toward the hopper the planter is thrown from its balance on the wheel, while by my construction the wheel remains in its proper central position and the hopper is made adjustable.

Having thus described my invention, what I claim as new, and desire to secure by Letters Patent, is—

In a cotton-seed planter, the revolving wheel F, provided with a circular row of pins, *a a*, in combination with the adjustable hopper *b*, sliding heads H H', provided with the slots *e e* and set-screws *i i*, all constructed to operate substantially as and for the purpose herein described.

JOHN H. WALKER.

Witnesses:
A. J. MOSELY,
W. A. McDANIEL.